US 6,644,138 B2

(12) United States Patent
Dörrie

(10) Patent No.: US 6,644,138 B2
(45) Date of Patent: Nov. 11, 2003

(54) VARIABLE SPEED GEAR TRANSMISSION

(75) Inventor: Swen Dörrie, Herzogenaurach (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/957,328

(22) Filed: Sep. 20, 2001

(65) Prior Publication Data
US 2002/0033060 A1 Mar. 21, 2002

(30) Foreign Application Priority Data
Sep. 21, 2000 (DE) .......................... 100 46 719

(51) Int. Cl.$^7$ ................ F16H 3/08; F16C 13/00; F16C 35/00
(52) U.S. Cl. ............................ 74/333; 384/491
(58) Field of Search ................ 74/333, 334; 384/491, 384/553, 565, 567

(56) References Cited

U.S. PATENT DOCUMENTS

| 3,441,327 A | | 4/1969 | Peter et al. | |
| 4,505,523 A | * | 3/1985 | Stephan | 384/445 |
| 4,577,980 A | * | 3/1986 | Weichenrieder | 384/462 |
| 5,443,317 A | * | 8/1995 | Momono et al. | 384/450 |

FOREIGN PATENT DOCUMENTS

| DE | 1842145 | 11/1961 |
| DE | 1261709 | 2/1968 |
| DE | 2726914 | 12/1977 |
| DE | 2741057 | 3/1979 |
| DE | 2918601 | 11/1980 |
| DE | 4124838 | 5/1992 |
| DE | 4401531 | 7/1995 |
| DE | 19734980 | 2/1999 |

OTHER PUBLICATIONS

Patent Abstracts of Japan Pub. #09049528A, appln. #07200919, filed: Jul. 8, 1985 Oilless Roller Bearing (1 pg).
Patent Abstracts of Japan, M–1221, Mar. 13, 1992, vol. 16, No. 103, Oscillating Bearing (1 pg).

* cited by examiner

Primary Examiner—Sherry Estremsky
Assistant Examiner—Tisha D. Lewis
(74) Attorney, Agent, or Firm—Muserlian, Lucas and Mercanti

(57) ABSTRACT

An idler gear (7) is mounted in a variable speed gear transmission (1) on a rolling bearing crown ring (10) whose first and second rolling elements (12, 20) are guided in a cage (11) and have different diameters. The first and second rolling elements (12, 20) are of a same type, size ratios between the first and second rolling elements are defined so that, in an unloaded state, the larger diameter of the second rolling elements (20) is such as to become equal to a diameter of the first rolling elements (12) in an engaged state under radial loading, whereby a limit of elasticity of the second rolling elements (20) having the larger diameter in the unloaded state is not exceeded.

2 Claims, 2 Drawing Sheets

VARIABLE SPEED GEAR TRANSMISSION

FIELD OF THE INVENTION

The invention concerns a variable speed gear transmission comprising at least one gearwheel mounted through a rolling bearing on a transmission shaft, in which the gearwheel can be coupled to the transmission shaft through a coupling element, first cylindrical rolling elements being arranged in a cage in radial direction between an inner raceway formed on the transmission shaft and an outer raceway formed on a hub of the gearwheel, said cage comprising in pockets at least at three circumferential points, second cylindrical rolling elements having a slightly larger diameter than the first rolling elements.

BACKGROUND OF THE INVENTION

Gearwheels of the pre-cited type for variable speed gear transmissions, also called idler gears, are frequently arranged on the transmission shaft in split rolling bearing cages that expand under the effect of their inherent elasticity and come into play-free contact with the rolling elements. A cage of this type is known from DE 41 24 838 A1.

In a no-load, unengaged condition, the bearing may not run kinematically under certain circumstances i.e., it may be subject to slippage. In the extreme case, the transmission shaft can come to a standstill and the idler gear may reach a speed of several hundred or several thousand rotations per minute. When the cage starts to rotate, the rolling elements are pressed against the outer raceway due to the centrifugal force so that the cage can reach approximately the same speed of rotation as the idler gear while, due to the operational clearance, the rolling elements can lose contact with the raceway of the transmission shaft. This results in a sliding movement of the rolling elements on the raceway of the transmission shaft that leads to increased wear and/or smearing in case of a sudden loading of the rolling elements.

Efforts have been made to solve this problem by modifying the kinematics of the bearing during idling operation.

One possibility of achieving this is to reduce the number of load-bearing rolling elements involved in idling operation. This results in a distribution of the weight of the idler gear among only a small number of rolling elements. Thus, for example, it is known from DE-OS 29 18 601 to mount shafts in a variable speed gear transmission through a bearing cage in which three circumferentially equally spaced pockets contain rolling elements having a larger diameter than the rest of the rolling elements. FIGS. 3 and 4 of this prior art document show a cage in which these larger diameter rolling elements are made in the form of hollow coiled wire cylinders.

In DE 44 01 531 A1 an attempt is made to solve this problem, well known in the field of rolling bearings, by configuring needle rollers with an arcuate shape so that a radially elastically yielding arch is formed at their centers.

It is also known from DE-OS 27 41 057 to configure a bearing so that it comprises a plurality of circumferentially spaced rolling elements whose enveloping circle diameter is smaller than the diameter of the shaft and that are deformable in radial direction. These rolling elements made of a plastic or of thin hollow steel bodies are arranged between the normal rolling elements and have a slightly larger diameter than these so that, in the installed state, they effect a pre-stressing of the bearing.

A drawback of all the above solutions is that the rolling elements of larger diameter are of a different type from the remaining rolling elements and are very expensive to manufacture so that the total costs of the idler gear bearing are increased.

OBJECTS OF THE INVENTION

It is an object of the invention to provide an idler gear bearing which possesses the property of elastic deformation of some of its rolling elements and still can be manufactured without extra fabrication costs.

This and other objects and advantages of the invention will become obvious from the following detailed description.

SUMMARY OF THE INVENTION

The invention achieves the above objects by the fact that the first and second rolling elements are of a same type, size ratios between the first and second rolling elements are defined so that, in an unloaded state, the larger diameter of the second rolling elements is such as to become equal to a diameter of the first rolling elements in an engaged state under radial loading, whereby a limit of elasticity of the second rolling elements having the larger diameter in the unloaded state is not exceeded.

The provisions of the invention for the configuration of the idler gear bearing enable a simple but effective use of the law of elasticity for modifying the kinematics of the bearing. The invention utilizes the ability of the larger cylindrical rolling elements to reverse shape and volume variations brought about by outer forces or torques, in the present case by gear shifting, so that, in the engaged state under load, all the rolling elements have the same diameter while, in idling operation, the bearing comprises rolling elements of different diameters. It is quite obvious that the idler gear bearing of the invention having rolling elements of one and the same type is much simpler to manufacture than prior art bearings with different types of rolling elements. Moreover, the filling of rolling elements of the same type but with different diameters into the same bearing cage poses no problem from the fabrication point of view.

According to further advantageous propositions of the invention, the diameter of the larger rolling elements is 2 to 5 µm larger than the diameter of the rest of the rolling elements. The larger rolling elements and the rest of the rolling elements are arranged in alternating sequence with one another but it is also possible to arrange them in any other order.

The invention will now be described with reference to one example of embodiment illustrated in the appended drawings.

DETAILED DESCRIPTION OF THE DRAWINGS

Figure 1:
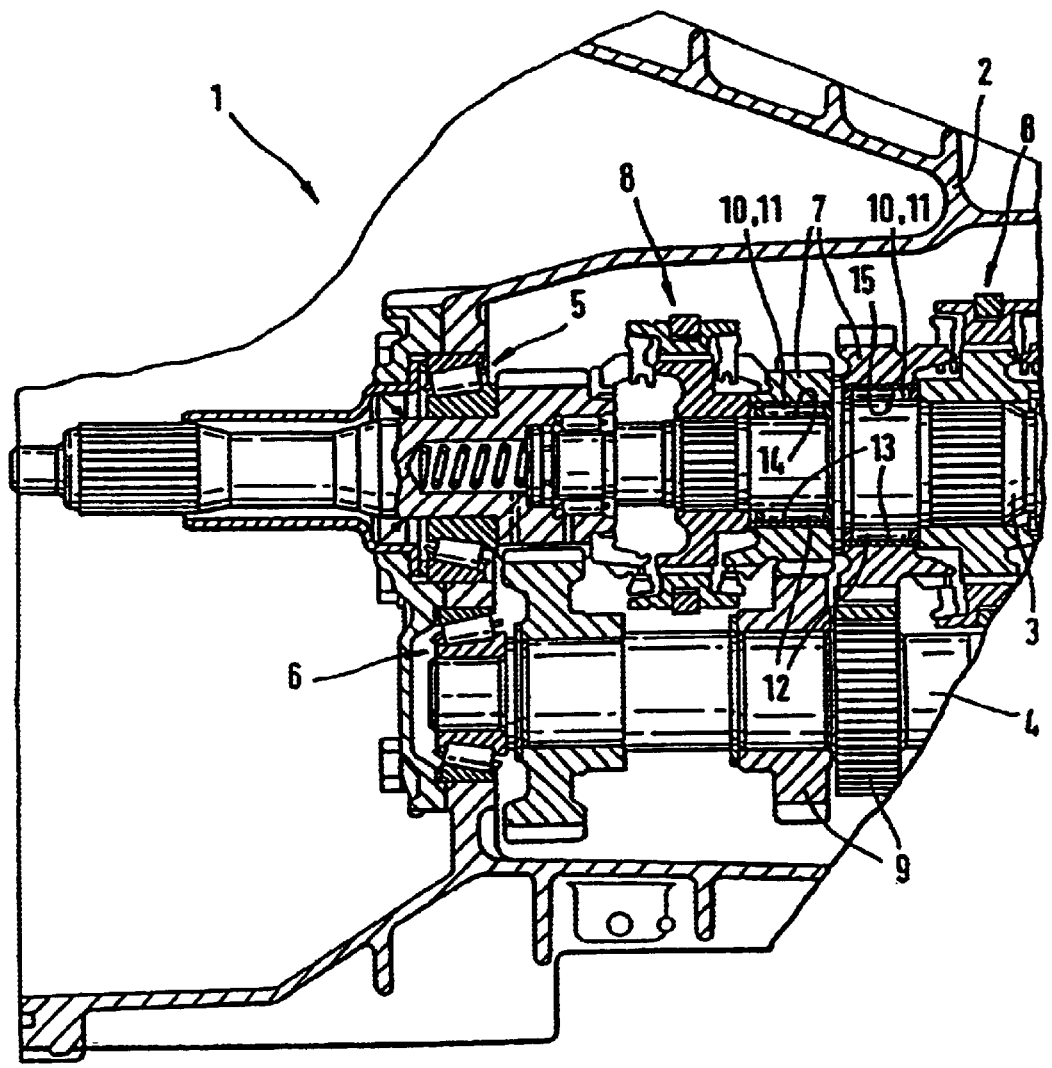
FIG. 1 is a longitudinal cross-section through a partially represented prior art variable speed gear transmission for an automotive vehicle.

The variable speed gear transmission 1 illustrated in FIG. 1 comprises a housing 2 in which the transmission shaft 3 and the countershaft 4 are retained through taper roller bearings 5 and 6. Freely rotatable gearwheels, so-called idler gears 7, and gearshift clutches 8 through which the idler gears 7 can be positively engaged with the transmission shaft 3 are arranged on the transmission shaft 3. The idler gears 7 mesh with gearwheels 9 that are arranged on the countershaft 4. The idler gears 7 are mounted on the transmission shaft 3 through rolling bearing crown rings 10 each of which is made up of a rolling bearing cage 11 having a gap 16 and cylindrical rolling elements 12 arranged in the cage 11. A bushing 13 is arranged between the rolling bearing crown ring 10 and the idler gear 7 so that the cylindrical rolling elements 12 roll on an inner raceway 14 formed on the transmission shaft 3 and on an outer raceway 15 formed on the inner peripheral surface of the bushing 13.

Figure 2:
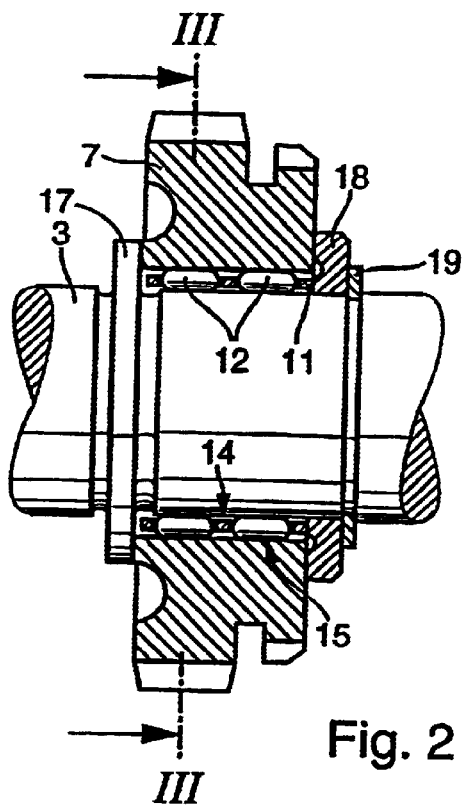
FIG. 2 is a longitudinal cross-section through a prior art idler gear.
Figure 3:
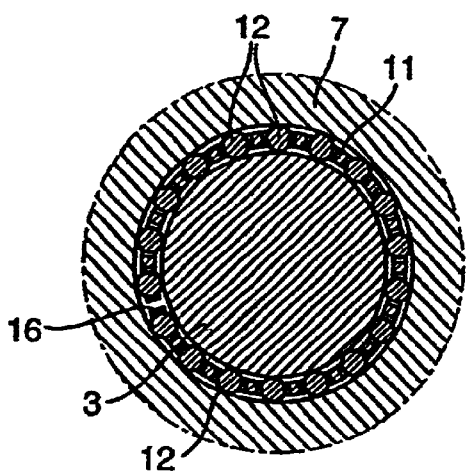
FIG. 3 is a cross-section along line III—III of FIG. 2.

The idler gear 7 shown in FIGS. 2 and 3 is mounted through two adjacent rows of cylindrical rolling elements 12, the outer raceway 15 being formed in this case directly on the hub of the idler gear 7. The axial freedom of movement of the idler gear 7 is limited on one side by the shaft collar 17 and on the other side by the washer 18 that is secured by the snap ring 19.

Figure 4:
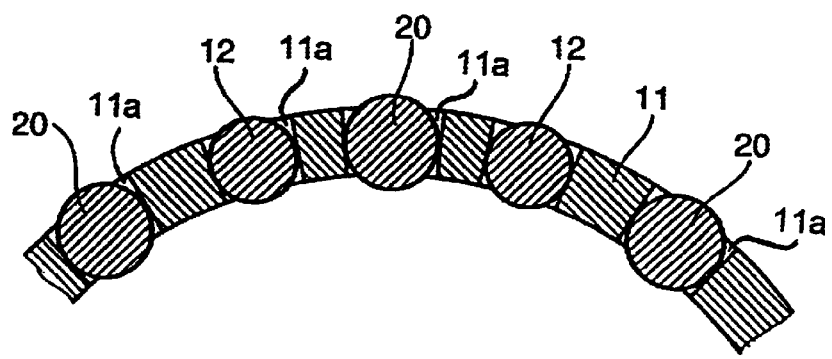
FIG. 4 is an enlarged representation of a section of a cage having rolling elements of different diameters as provided by the invention.

FIG. 4 shows an enlarged section of the cage 11 comprising in pockets ha cylindrical rolling elements 12 arranged in alternating sequence with, as proposed by the invention, cylindrical rolling elements 20 of the same type made of a rolling bearing steel and whose diameter in the unloaded state, i.e. in idling operation, is slightly larger. In the loaded state, i.e. in the engaged condition, the rolling elements 12 and the rolling elements 20 have the same diameter but the rolling elements 20 may only be loaded to the extent that their limit of elasticity is not exceeded. This maintains the ability of the rolling elements 20 to be restored to their larger diameter compared to the rolling elements 12 in the unloaded state, i.e. in idling operation so that the change of shape that had taken place is reversed. This assures that the number of rolling elements supporting load in idling operation, i.e. the rolling elements 20, can be reduced, and this has a positive effect on the kinematics of the bearing.

What is claimed is:

1. A variable speed gear transmission comprising at least one gearwheel mounted through a rolling bearing on a transmission shaft, in which the gearwheel can be coupled to the transmission shaft through a coupling element, first cylindrical rolling elements being arranged in a cage in radial direction between an inner raceway formed on the transmission shaft and an outer raceway formed on a hub of the gearwheel, said cage comprising in pockets at least at three circumferential points, second cylindrical rolling elements having a slightly larger diameter than the first cylindrical rolling elements, wherein the first and second cylindrical rolling elements are of a same size ratio between the first and second cylindrical rolling elements defined so that, in a loaded state, the larger diameter of the second cylindrical rolling elements is to become equal to a diameter of the first cylindrical rolling elements in an engaged state under radical loading, whereby the limit of elasticity of the second cylindrical rolling elements having the larger diameter in an unloaded state is not exceeded and the larger diameter of the second cylindrical rolling elements is 2 to 5 $\mu$m larger than the diameter of the first cylindrical rolling elements in the unloaded state.

2. A variable speed gear transmission of claim 1 wherein the first and the second cylindrical rolling elements are arranged in alternating sequence next to one another.

* * * * *